United States Patent [19]

Smith

[11] 3,760,222

[45] Sept. 18, 1973

[54] PINCUSHION CORRECTED VERTICAL DEFLECTION CIRCUIT

[75] Inventor: Lawrence Edward Smith, Indianapolis, Ind.

[73] Assignee: RCA Corporation, New York, N.Y.

[22] Filed: Feb. 7, 1972

[21] Appl. No.: 224,191

Related U.S. Application Data

[62] Division of Ser. No. 37,668, May 15, 1970, Pat. No. 3,684,970.

[52] U.S. Cl. .................. 315/27 GD, 315/28, 315/29

[51] Int. Cl. .............................................. H01j 29/70

[58] Field of Search ...................... 315/13 C, 27 TD, 315/27 GD, 27 R, 28, 29

[56] References Cited

UNITED STATES PATENTS

| | | | |
|---|---|---|---|
| 2,964,673 | 12/1960 | Stanley | 315/27 TD |
| 3,638,067 | 1/1972 | Dietz | 315/27 TD |

*Primary Examiner*—Carl D. Quarforth
*Assistant Examiner*—P. A. Nelson
*Attorney*—Eugene M. Whitacre

[57] ABSTRACT

Transistorized vertical deflection circuit employs output stage of class B, push-pull, complementary symmetry configuration with vertical yoke winding halves serially connected in output circuit. Miller integrator approach is used for sawtooth wave generation, with feedback waveform derived from yoke current sampling resistor. Discharge transistor is responsive to feedback of flyback pulses developed across serially connected yoke winding halves. Apparatus disposed between winding halves introduces modulated horizontal deflection frequency current components in winding halves for pincushion correcting purposes. One winding half of vertical deflection yoke is shunted by a capacitor of a value selected to introduce cancellation of horizontal deflection frequency components across yoke/pincushion circuitry, in order to minimize feedback of interlace-disturbing horizontal components in pincushion corrected vertical deflection circuit.

4 Claims, 1 Drawing Figure

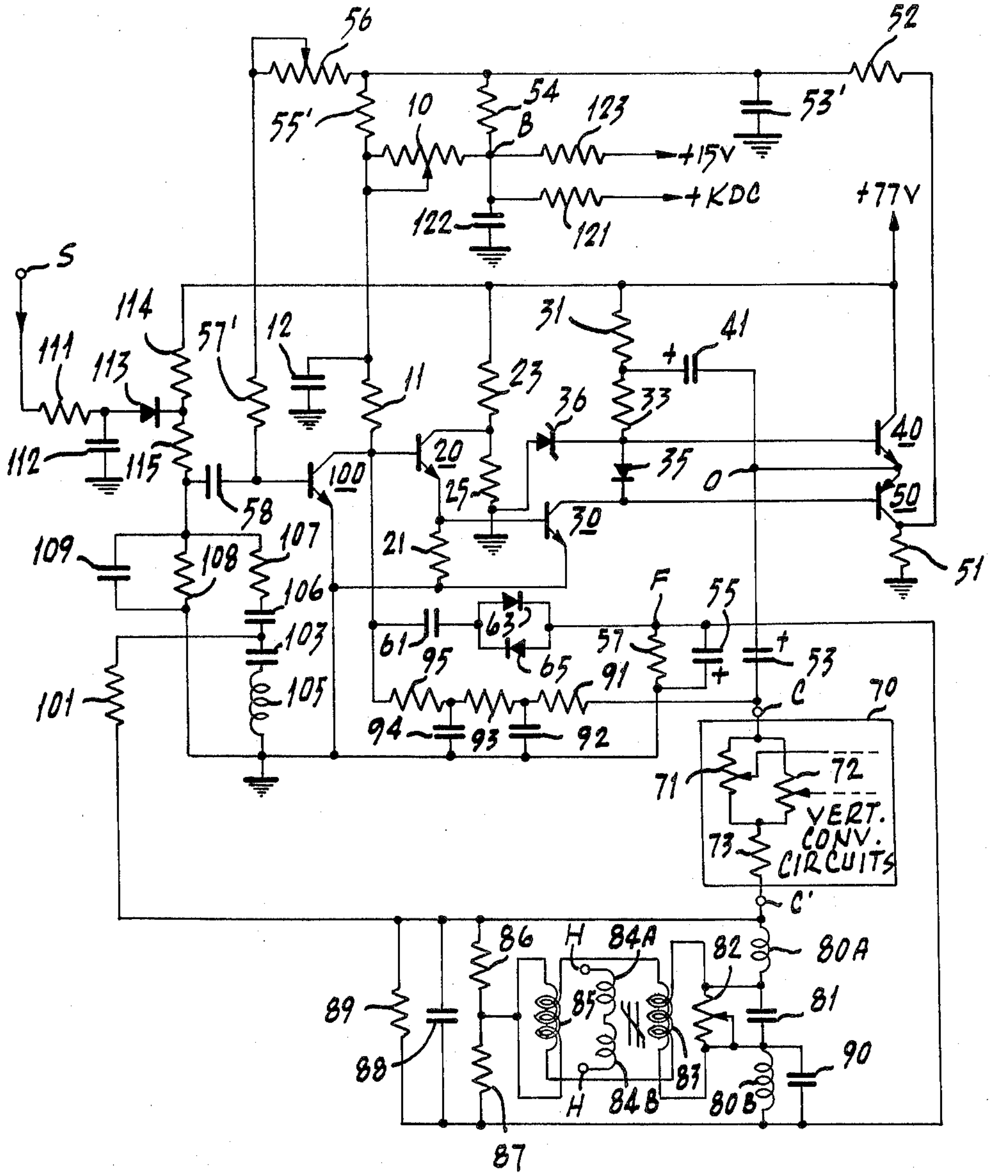
+15V
+KDC
+77V
VERT. CONV. CIRCUITS

PINCUSHION CORRECTED VERTICAL DEFLECTION CIRCUIT

This application is a division of my copending application, Ser. No. 37,668, filed May 15, 1970, now issued as U.S. Pat. No. 3,684,920.

The present invention relates generally to deflection circuits, and particularly to novel and improved pincushion corrected deflection circuitry suitable for satisfying the stringent vertical (i.e., field rate) deflection requirements of wide-angle color kinescopes.

In use of vertical deflection circuits with wide-angle color kinescopes, where dynamic pincushion correction is usually required, horizontal frequency correction components are caused to flow in the vertical deflection windings. One widely used technique for introducing such correction components is, for example, by means of a saturable reactor, as disclosed in U.S. Pat. No. 3,346,765, issued to William H. Barkow. A problem arises, however, with regard to maintenance of proper interlace if suitable care is not taken to avoid feedback of the horizontal deflection frequency correction components via feedback paths looped about the vertical deflection amplifier (where such are used) or via feedback paths associated with the discharge transistor control (where such are used). The present invention relates to novel deflection circuitry introducing a cancellation of horizontal deflection frequency voltage components in a manner significantly reducing the likelihood of interlace-disturbing feedback of horizontal components from the vertical deflection output circuit. Pursuant to an embodiment of the present invention, the desired cancellation is effected to a substantial degree by shunting across one vertical yoke winding half a capacitor presenting an impedance at the horizontal deflection frequency which approximates one half of the impedance presented by said winding half at the horizontal deflection frequency.

An object of the present invention is to provide a novel vertical deflection circuit with protection against interlace-disturbing feedback of horizontal frequency components associated with dynamic pincushion correction.

Other objects and advantages of the present invention will be readily recognized by those skilled in the art upon a reading of the following detailed description and an inspection of the accompanying drawing in which the sole FIGURE illustrates schematically a vertical deflection circuit for a color television receiver in accordance with an embodiment of the present invention.

Referring to the drawing initially for a general description of the illustrated deflection circuit, a vertical deflection wave amplifier is shown, having (a) an input stage comprising NPN transistor 20 disposed in an emitter follower configuration; (b) a driver stage employing NPN transistor 30 in a base-input, grounded emitter-configuration, responding to the output of emitter follower transistor 20; and (c) a class B, push-pull, complementary symmetry output stage employing NPN transistor 40 and PNP transistor 50, with bases driven in parallel by the collector output of driver transistor 30, and with joined emitters providing an output waveform at an output terminal 0.

The respective halves 80A and 80B of the vertical yoke winding are supplied with deflection current from output terminal 0 via a path including an electrolytic coupling capacitor 53 in series with vertical convergence circuitry 70, represented in the drawing by a block disposed between terminals C and C'. (The details of the vertical convergence circuitry, with which the present invention is not concerned, have been only partially shown in order to simplify the drawing.) The deflection current path is returned to chassis ground via a parallel RC network including a current sampling resistor 57.

A negative feedback path, including a capacitor 61, is looped around the deflection wave amplifier, extending between a feedback terminal F (at the ungrounded end of sampling resistor 57) in the amplifier output circuit and the base of input transistor 20.

Alternate charging of capacitor 61 from a D.C. supply point B via a charging path including resistors 10 and 11, and discharging thereof via a periodically conducting discharge transistor 100, result in sawtooth wave generation in accordance with Miller Integrator principles. Feedback of flyback pulses to the base of discharge transistor 100 from terminal C' in the output circuit is provided (via a path including resistor 101), establishing a well-known manner, a form of astable multivibrator action between discharge and output stages that renders the vertical deflection circuit self-oscillatory at a frequency slightly lower than the television field rate. Precise synchronization of the oscillations at the correct rate is obtained under the control of vertical synchronizing pulses derived from a synchronizing waveform supplied at terminal S.

In order to fully appreciate the improvements in deflection circuit operation of the form generally described above which are afforded by the features of the present invention, it is now in order to consider the illustrated circuitry in greater detail.

The charging of capacitor 61 to develop the trace portion of the input sawtooth waveform is effected via a charging path including variable resistor 10 (which serves as an adjustable height control), fixed resistor 11 (determining maximum height), forward biased diode 63 (aiding rapid turn-on of the input and driver stages at the end of retrace) and the sampling resistor 57. The charging potential developed at supply terminal B is, illustratively, a combination of voltages derived from (1) a statilized DC supply of the receiver, and (2) a DC potential varying directly with changes in kinescope ultor potential, and appears across a filter capacitor 122 at the output of a voltage divider formed by resistors 121 and 123 extending between the variable source (+KDC) and the stabilized supply (+15V.). In receivers lacking tight regulation of the kinescope ultor voltage, the provision of the +KDC component enables an automatic adjustment of the sawtooth waveform amplitude in a direction precluding raster height change with ultor voltage variation (e.g., providing a decrease in charging potential with resultant decreased sawtooth amplitude, when ultor voltage sag tends to increase raster size). Where tight regulation of the ultor voltage is provided, the variable component of the charging potential may be eliminated.

Discharge of capacitor 61 to develop the retrace portion of the input waveform occurs when discharge transistor 100 is rendered conducting, and is effected via a discharging path including the emitter-collector path of transistor 100, forward biased diode 65, and sampling resistor 57.

Input transistor 20 derives its collector potential from an intermediate point on a voltage divider formed by resistors 23 and 25 connected between a B+ supply (illustratively, +77 V.) and chassis ground. The emitter of transistor 20 is directly connected to the base of driver transistor 30, with emitter resistor 21 shunting the base-emitter path of the grounded-emitter driver transistor.

The collector of driver transistor 30 is directly connected to the base of the PNP output transistor 50, and is connected to the base of the NPN output transistor 40 via a forward biased diode 35. The series combination of bias resistors 31 and 33 links the base of NPN output transistor 40 to the +77 volt supply. The voltage drop across forward biased diode 35, providing an offset between the output transistor bases, aids in minimizing crossover distortion at the center of scan; however, the AC feedback effects in the illustrated circuit will permit deletion of the diode without serious distortion results.

Pursuant to a stabilizing feature of my aforementioned application, Ser. No. 37,688, a reverse biased diode 36 is connected between the base of NPN transistor 40 and chassis ground. During retrace, when driver transistor 30 is non-conducting, diode 36 is biased into the Zener region and operates as a Zener diode holding the voltages at the base and emitter electrodes of transistor 40 at a substantially constant level, independent of B+ variations. The benefits provided by this feature will be discussed in greater detail subsequently.

The complementary symmetry output stage circuit configuration is otherwise of conventional form, with the collector of output transistor 40 connected directly to the +77 volt supply, with the emitters of the output pair connected directly together and to an output terminal 0, and with the collector of output transistor 50 returned to ground via a resistor 51. Resistor 51 provides a source of an end-of-trace voltage variation, useful for frequency control purposes to be subsequently described. "Bootstrap" capacitor 41 couples the output terminal 0 to the junction of the bias resistors 31 and 33, with attendant efficiency advantages.

A trio of waveforms are applied to the base of discharge transistor 100 to control its conduction:

A. A flyback pulse derived from terminal C′ in the deflection output circuit is coupled to the discharge transistor base via a path including resistor 101, capacitor 106, resistor 107 and capacitor 58. A parallel RC network, comprising resistor 108 and capacitor 109, connected between chassis ground and the junction of elements 107 and 58, cooperates with the series elements 106 and 107 to provide desired shaping of the feedback pulse. A series resonant network, formed by capacitor 103 and inductor 105 and tuned to horizontal deflection frequency, is connected between chassis ground and the junction of elements 101 and 106; this network cooperates with series resistor 101 to divide down residual horizontal frequency components, to preclude interlace disturbance.

B. A positive-going sawtooth wave occurring during the last half of trace appears across resistor 51 in the collector circuit of transistor 50. A resistive path, formed by the series combination of fixed resistors 52 and 57′ and variable resistor 56, links the collector of transistor 50 to the base of transistor 100, and cooperates with capacitor 58 to integrate the sawtooth component, providing a resultant voltage waveform at the discharge transistor base that is sharply rising at the end of the trace interval (with resultant noise immunity advantages). Variable resistor 56, providing control of the slope of the rising waveform, conveniently serves the vertical hold control function.

C. For synchronizing pulse application, a path is provided between a synchronizing waveform input terminal S and the discharge transistor base, which path includes resistor 111, diode 113, resistor 115 and capacitor 58. A capacitor 112 is connected between the junction of resistor 111 and diode 113 and chassis ground; series resistor 111 and shunt capacitor 112 provide an initial filter, reducing the horizontal synchronizing component of the composite synchronizing waveform at the input of diode 113. Resistor 114, connected between the +77 volt supply and the junction of diode 113 and resistor 115, establishes a DC voltage divider with resistors 115 and 108 to provide a bias potential at the cathode of diode 113, which maintains the diode reverse biased during the intervals between vertical synchronizing periods (isolating the discharge transistor from the sync input terminal S during such intervals to avoid untimely triggering). Resistor 115 forms a final integrator with capacitor 109 to complete the selection of the vertical synchronizing component and rejection of the horizontal synchronizing component.

A variable DC component is also supplied to the discharge transistor base. For this purpose, the junction of resistors 52 and 56 (in the feedback path from the transistor 50 collector) is connected to an intermediate point on a voltage divider formed by resistors 54 and 55′, connected in series across the height control resistor 10. When the amplitude of the deflection output waveform is varied by manual adjustment of the height control, the resultant changes in the waveforms fed back to the discharge transistor base can undesirably vary the operating frequency of the deflection circuit, causing loss of synchronization, if compensation is not provided. The connection to the divider 54–55′ introduces a DC component shift at the discharge transistor base tailored to provide the required compensation. Similarly, the connection to the divider introduces the required compensation at the discharge transistor base when a +KDC component change alters the output waveform amplitude.

As previously mentioned, the deflection output current path provided between terminal 0 and chassis ground includes, in series, coupling capacitor 53, convergence circuitry 70, the deflection winding 80A–80B and the current sampling network 57–55. Not heretofore described is the top-and-bottom pincushion circuitry associated with the winding halves 80A, 80B. Interposed between the winding halves is a circuit including a parallel R-C network formed by capacitor 81 and variable resistor 82, and, in shunt with that network, an output winding 83 of the saturable reactor in series with an adjustable coil 85. Winding 83 has two bifilar wound segments, as does coil 85. The bifilar wound segments of coil 85 are interposed between the reactor winding segments in the deflection current path, and the junction of the coil 85 segments is connected to the junction of a pair of damping resistors 86 and 87. The end terminals of resistors 86, 87 remote from their junction are connected, respectively, to terminals C′ and F (at opposite ends of the windings). The input windings 84A and 84B are energized in series with a horizontal rate component derived from suitable terminals H, H' in the receiver's horizontal deflection circuit (not illustrated).

The pincushion correction circuitry as above described is essentially identical with that disclosed in U.S. Pat. No. 3,329,859, issued to Eugene A. Lemke, and reference may be made to that patent for a full explanation of its operation. For present purposes, it may generally be noted that a horizontal deflection frequency current component of a first polarity and declining magnitude during the first half of trace, and of the opposite polarity and rising magnitude during the second half of trace, is caused to flow in the vertical windings from a source constituted by the reactor circuitry. To obtain an adequate level of drive, the reactor output winding is nominally tuned to the horizontal deflection frequency by capacitor 81, with adjustable coil 85 providing a vernier frequency adjustment for precise phasing control. Variable resistor 82, controlling the Q of the resonant circuit, provides a facility for adjusting the magnitude of correction.

While the foregoing circuitry properly performs the desired pincushion correction, a problem is posed in that a horizontal deflection frequency component voltage appears as a consequence across the deflection windings (i.e., between terminals C' and F). To the extent that this voltage is permitted to introduce a horizontal frequency component in the signals fed back to the bases of discharge transistor 100 and input transistor 20, undesired disturbances of the deflection circuit operation can result, including loss of interlace.

A number of expedients may be employed to limit such horizontal component feedback; the previously described use of resonant network 103 is one such aid. An additional aid is capacitor 55 which shunts the current sampling resistor 57, and is of sufficiently large value to bypass the small-valued sampling resistor to a moderate degree at horizontal frequency. A further aid is the provision of capacitor 88, connected between terminals C' and F, and lowering the impedance presented between those terminals at horizontal frequency. All of the foregoing expedients, however, are of limited efficacy because of design constraints associated with the feedback functions. For example, it is believed to be requisite to substantially match the RC time constant of sampling network 57–55 with the RC time constant associated with capacitor 88 (the value of resistor 89, in shunt therewith, being dictated by this goal). In the absence of such matching, a frequency selective characteristic is introduced in the Miller feedback circuit with resultant undesired phase distortion.

The present invention is directed to a solution of the above-described horizontal component feedback problem, which solution is provided by the shunting of capacitor 90 across one of the vertical deflection winding halves (i.e., across winding half 80B, in the illustrated circuit). The value of capacitor 90 is chosen to present an impedance at the horizontal deflection frequency that is approximately half the horizontal frequency impedance presented by the winding half. As a result of such value choice, a horizontal deflection frequency current of approximately twice the magnitude of the horizontal current in winding 80B flows in the opposite direction through capacitor 90. The resultant of the algebraic summing of the winding 80B current and capacitor 90 current is the current returning through damping resistor 87. This current develops a voltage across resistor 87 which is of the same magnitude as would be developed thereacross in the absence of capacitor 90; however, its polarity is opposite to that which would be present if capacitor 90 was absent. The consequence is that the horizontal component voltage drop across resistor 87 is essentially equal and opposite to the voltage drop across resistor 86, thus resulting in substantial cancelling of the horizontal deflection frequency component voltage between terminals C' and F.

While the above-described cancelling technique does introduce an imbalance in an otherwise symmetrical and balanced network, it has been observed that the symmetry of deflection and pincushion correction is not disturbed to any troublesome degree.

As noted previously, the details of convergence circuitry 70 are not of direct concern herein. A portion of the circuitry, comprising the series combination of resistor 73 and paralleled potentiometers 71 and 72, has been shown to illustrate completion of the vertical deflection current path between terminals C and C'. The convergence circuitry appears to the deflection current as a relatively low impedance, essentially resistive network.

A final feedback path to be described is that provided between output circuit terminal C and the base of input transistor 20 for familiar purposes of S-shaping the deflection output current. The voltage waveform at terminal C, comprising essentially a sawtooth wave and superimposed flyback pulse, is applied to a pair of RC integrating circuits in cascade (formed by resistor 91 and capacitor 92, and resistor 93 and capacitor 94, respectively) to develop an essentially parabolic voltage wave across capacitor 94. This voltage waveform is applied via resistor 95 to the base of input transistor 20 for a final integration resulting in the desired S-shaping component.

Use of Zener diode 36, per the stabilizing feature briefly described previously, ensures clamping of the peak of flyback pulse voltage developed across the deflection windings during retrace, at a substantially fixed level (illustratively, 65 volts), independent of B+ variations. Such operation stabilizes the output waveform amplitude and the retrace interval duration against adverse effects of B+ variations, eliminating annoying disturbances of the raster size, such as so-called "line bobs". Additionally, as noted previously, the fixed level clamping holds essentially constant the dissipation requirements imposed on the PNP transistor 50, enabling the receiver manufacturer to employ a moderate dissipation rating PNP power transistor with assurance of satisfactory operation under adverse B+ condition.

A set of values for the various components shown in the drawing, use of which values has provided satisfactory operation of the illustrated circuitry driving the (8 ohm, 15.5 millihenry) vertical winding of a 110° yoke, is given, by way of example only, in the table below:

TABLE OF COMPONENT VALUES

| | |
|---|---|
| Resistor 10 | 50,000 ohms |
| Resistor 11 | 82,000 ohms |
| Resistor 21 | 5,600 ohms |
| Resistor 23 | 68,000 ohms |
| Resistor 25 | 22,000 ohms |
| Resistor 31 | 330 ohms |
| Resistor 33 | 1,000 ohms |
| Resistor 51 | 3.0 ohms |
| Resistor 52 | 47,000 ohms |
| Resistor 54 | 2.2 megohms |
| Resistor 55' | 680,000 ohms |
| Resistor 56 | 50,000 ohms |
| Resistor 57 | 2.2 ohms |

| | |
|---|---|
| Resistor 57' | 10,000 ohms |
| Resistor 71 | 10 ohms |
| Resistor 72 | 10 |
| Resistor 73 | 3.3 ohms |
| Resistor 82 | 10,000 ohms |
| Resistor 86 | 100 ohms |
| Resistor 87 | 100 ohms |
| Resistor 89 | 330 ohms |
| Resistor 91 | 68,000 ohms |
| Resistor 93 | 100,000 ohms |
| Resistor 95 | 56,000 ohms |
| Resistor 101 | 470 ohms |
| Resistor 107 | 10,000 ohms |
| Resistor 108 | 680 ohms |
| Resistor 111 | 10,000 ohms |
| Resistor 114 | 47,000 ohms |
| Resistor 115 | 8,200 ohms |
| Resistor 121 | 100,000 ohms |
| Resistor 123 | 12,000 ohms |
| Capacitor 12 | 0.01 microfarad |
| Capacitor 41 | 10 microfarads |
| Capacitor 53 | 500 microfarads |
| Capacitor 53' | 1,000 picofarads |
| Capacitor 55 | 18 microfarads |
| Capacitor 58 | 0.22 microfarad |
| Capacitor 61 | 0.47 microfarad |
| Capacitor 81 | 0.056 microfarad |
| Capacitor 88 | 0.39 microfarad |
| Capacitor 92 | 0.1 microfarad |
| Capacitor 94 | 0.1 microfarad |
| Capacitor 103 | 0.22 microfarad |
| Capacitor 106 | 0.1 microfarad |
| Capacitor 109 | 0.22 microfarad |
| Capacitor 112 | 0.0015 microfarad |
| Capacitor 122 | 1,000 picofarads |
| Transistor 20 | Type 2N3565 |
| Transistor 30 | Type MM3006 |
| Transistor 40 | Type 2N5496 |
| Transistor 50 | Type 2N4920 |
| Transistor 100 | Type 2N3643 |
| Diodes 35, 63, 65, 113 | Type FDH600 |
| Zener Diode 36 | 65V., 2%, 0.4W |

What is claimed is:

1. In a color television receiver, a vertical deflection circuit subject to introduction of a horizontal deflection frequency component for dynamic top-and-bottom pincushion correction of a displayed raster, said vertical deflection circuit including a vertical deflection winding having symmetrical halves traversed serially by a vertical deflection current;

a parallel resonant network serving as a source of said horizontal deflection frequency correction component and tuned to a frequency in the immediate vicinity of said horizontal deflection frequency, said network being interposed between said deflection winding halves for traversal by said vertical deflection current;

a pair of similarly valued resistors connected in series between respective end terminals of said deflection winding halves remote from said resonant network, the junction of said series connected resistors being connected to an intermediate point in said parallel resonant network;

and means, comprising a capacitor shunted across one of said winding halves, for providing substantial cancellation of horizontal deflection frequency voltage components between said end terminals.

2. In a color television receiver, a vertical deflection circuit subject to introduction of a horizontal deflection frequency component for dynamic top-and-bottom pincushion correction of a displayed raster, said vertical deflection circuit including a vertical deflection winding having symmetrical halves traversed serially by a vertical deflection current;

a parallel resonant network serving as a source of said horizontal deflection frequency correction component and tuned to a frequency in the immediate vicinity of said horizontal deflection frequency, said network being interposed between said deflection winding halves for traversal by said vertical deflection current;

a pair of similarly valued resistors connected in series between respective end terminals of said deflection winding halves remote from said resonant network, the junction of said series connected resistors being connected to an intermediate point in said parallel resonant network;

and a capacitor shunted across one of said winding halves, said capacitor having a capacitance value such that said capacitor presents an impedance at said horizontal deflection frequency approximately half the value of impedance presented at said horizontal deflection frequency by said one winding half.

3. In a television receiver, a vertical deflection circuit comprising the combination of:

vertical deflection wave generating means;

a deflection yoke having a pair of vertical deflection winding sections;

a vertical deflection wave amplifier having an input circuit coupled to said vertical deflection wave generating means and an output circuit in which said pair of vertical deflection winding sections are serially connected;

feedback means coupled between said output circuit and said deflection wave generating means for rendering said generating means responsive to the voltage appearing across said serially connected vertical deflection winding sections;

dynamic pincushion correcting means disposed in series with said vertical deflection winding sections for causing the flow of horizontal deflection frequency current components in said winding sections;

and means for protecting said generating means from disturbance by feedback of horizontal deflection frequency voltage components, said last-named means comprising a capacitor shunted across one of said vertical deflection winding sections.

4. Apparatus in accordance with claim 3 wherein said capacitor has a capacitance value of such a magnitude that siaid capacitor presents an impedance at said horizontal deflection frequency approximating half the value of impedance presented at said horizontal frequency by said one vertical deflection winding section.

* * * * *